United States Patent [19]

Kwech et al.

[11] Patent Number: 4,677,884
[45] Date of Patent: Jul. 7, 1987

[54] PORTABLE END PREP LATHE

[75] Inventors: Horst Kwech, Lake Bluff; Peter K. Olson, Buffalo Grove, both of Ill.

[73] Assignee: The E. H. Wachs Company, Wheeling, Ill.

[21] Appl. No.: 720,170

[22] Filed: Apr. 5, 1985

[51] Int. Cl.[4] .............................................. B23B 5/16
[52] U.S. Cl. ...................................................... 82/4 C
[58] Field of Search .................. 82/4 C, 4 R; 144/205

[56] References Cited

U.S. PATENT DOCUMENTS

| | | | |
|---|---|---|---|
| 2,537,916 | 1/1951 | Rosenboom | 144/205 |
| 3,141,365 | 7/1964 | Peters | 82/4 R |
| 3,540,328 | 11/1970 | Foss | 144/205 |
| 3,908,491 | 9/1975 | Gilmore | 82/4 C |
| 4,175,471 | 11/1979 | Wilger et al. | 82/4 R |
| 4,322,991 | 4/1982 | Feamster, III | 82/4 C |
| 4,397,202 | 8/1983 | Mayfield et al. | 82/4 C |
| 4,411,178 | 10/1983 | Wachs et al. | 82/4 C |

FOREIGN PATENT DOCUMENTS 665986 6/1979 U.S.S.R. .............. 82/4 C

OTHER PUBLICATIONS

Drawings as appearing in Wachs et al, U.S. Ser. No. 654,810, filed Sep. 26, 1984, (Prosecution in Art Unit 321).
Drawings as appearing in Kwech et al, U.S. Ser. No. 610,656, filed May 11, 1984, (Batch No. H59).

Primary Examiner—Nicholas P. Godici
Assistant Examiner—Jerry Kearns
Attorney, Agent, or Firm—Wood, Dalton, Phillips, Mason & Rowe

[57] ABSTRACT

A portable end prep lathe having presettable mechanical structure operable in response to rotation of a tool head for controlling the angle of a bevel cut on a pipe.

A frame is supported relative to a pipe by a mast having a threaded section. The frame carries a rotatable tool head having a tool slide movable to advance a tool radially of the mast. The rate of radial advance of the tool slide is controlled by cam and cam follower structure mounted on the frame and tool head, respectively, and with the number of cams controlling the rate of advance per revolution of the tool head. The tool head is advanced axially of the mast and a pipe by means responsive to rotation of the tool head, including a star wheel mounted on the frame and drivingly connected to a nut threaded on the threaded section of the mast. The tool head has a plurality of circumferentially-spaced actuator pins for coaction with the star wheel to cause indexing thereof as the tool head rotates and resulting axial movement of the tool head whereby, with the radial advance of the tool slide, a bevel is cut on the pipe. The angle of the bevel can be determined by the number of actuator pins that are operable in each rotation of the tool head to index the star wheel and, if a lesser number than all of the actuator pins is initially used, additional actuator pins can be rendered operative during the machining cycle, without stopping the machine, to increase the axial feed and, therefore, the angle of the bevel that is cut on the pipe.

4 Claims, 4 Drawing Figures

PORTABLE END PREP LATHE

BACKGROUND OF THE INVENTION

This invention pertains to a portable end prep lathe and, more particularly, to such a lathe which can be easily set up and operated for bevelling a pipe end. The structure provides for preselecting a bevel from a predetermined number of different angles and can be changed by manually-operable means to achieve a compound angle bevel without stopping the machine.

DESCRIPTION OF THE PRIOR ART

The use of a portable end prep lathe, either in the field or in a shop, for performing a variety of machining operations on a pipe is well known in the art. The end prep lathe is mounted concentrically with the pipe by means of a mast having a chuck or mandrel which is positioned within the pipe and is adjusted to lock into the pipe, with the mast extending outwardly therefrom and mounting a frame or housing and a rotatable tool head. The tool head is rotatable by means of a motor, such as a hydraulic or air motor.

In one type of machine, the advance of the tooling on the tool head towards the pipe as well as the axial movement of the frame and the tool head axially of the pipe, determines the angle of the bevel cut on the pipe. Without axial movement of the tool head and frame, there can be a cut-off or facing operation. It is known to achieve a bevel cut by use of a portable end prep lathe wherein the frame and tool head are advanced axially by rotation of a hand wheel.

A more precise method for cutting a bevel is shown in the Wachs et al application Ser. No. 654,810, filed Sept. 26, 1984 and the Kwech et al application Ser. No. 610,656, filed May 11, 1984. The end prep lathe shown in these applications cuts a bevel on the end of the pipe without axial advance of the frame and tool head by placing a tool post on the tool head at the desired angle of bevel whereby a tool is moved relative to the pipe along an inclined path at the desired angle of bevel as the tool head rotates.

SUMMARY OF THE INVENTION

A primary feature of the invention is to provide a portable end prep lathe which can cut a predetermined bevel on an end of a pipe by means operable in response to the rotation of a tool head of the lathe which controls both the radial advance of a tool and the axial advance of the tool head whereby the tool is caused to advance at an angle relative to the pipe to cut the bevel.

An object of the invention is to provide a portable end prep lathe having a construction providing a new and improved operation in cutting a bevel on a pipe and, additionally, having means readily operable for selecting a predetermined angle of the bevel and for cutting a compound bevel without stopping machine operation.

Another object of the invention is to provide a portable end prep lathe having a tool head rotatably mounted on a frame, with the frame being axially movable along a mast supported by the pipe and with the tool head carrying a tool slide which may be advanced at a controlled rate determined by rotation of the tool head and the tool head and frame can be advanced axially at a controlled rate responsive to rotation of the tool head.

In carrying out the foregoing, the frame mounts one or more cams and the tool head carries the tool slide advancing means including a cam follower engageable with successive cams on the frame as the tool head rotates whereby the radial advance of the tool slide is at a rate determined by the number of cams circumferentially spaced about the frame. The tool head and frame are caused to move axially of the mast by operation of a star wheel mounted on the frame, which is drivingly connected to a nut rotatably supported on the frame and threaded onto a threaded section of the mast. The tool head carries a plurality of circumferentially-spaced actuator pins which are caused to successively engage the star wheel as the tool head rotates for imparting axial movement to the frame and tool head.

The circumferentially-spaced actuator pins for actuating the star wheel enable selection of the desired angle of the bevel cut on the pipe. With four of the actuator pins all in an operative position, a large angle bevel may be cut because of the axial advance of the frame and tool head relative to the radial advance of the tool slide. The star wheel actuator pins have both operative and inoperative positions whereby, if a lesser number of pins are operative, the bevel cut on the pipe will be of a lesser angle. Each of the actuator pins also has a pre-operative position, whereby, during the cutting operation, manually operable means on the frame may be activated to bring into operation those actuator pins which have been placed in a pre-operative position whereby a compound bevel may be cut on the end of the pipe.

A further object of the invention is to provide a portable end prep lathe for cutting a bevel on a pipe and having manually operable means for causing machine operation to cut a compound bevel without stopping the machine.

Still another object of the invention is to provide a portable end prep lathe having manually settable means carried by a rotatable tool head for setting the angle of the bevel to be cut on a pipe and with this means being controllable to select a predetermined angle of the bevel.

DESCRIPTION OF THE PREFERRED EMBODIMENT

Figure 1:
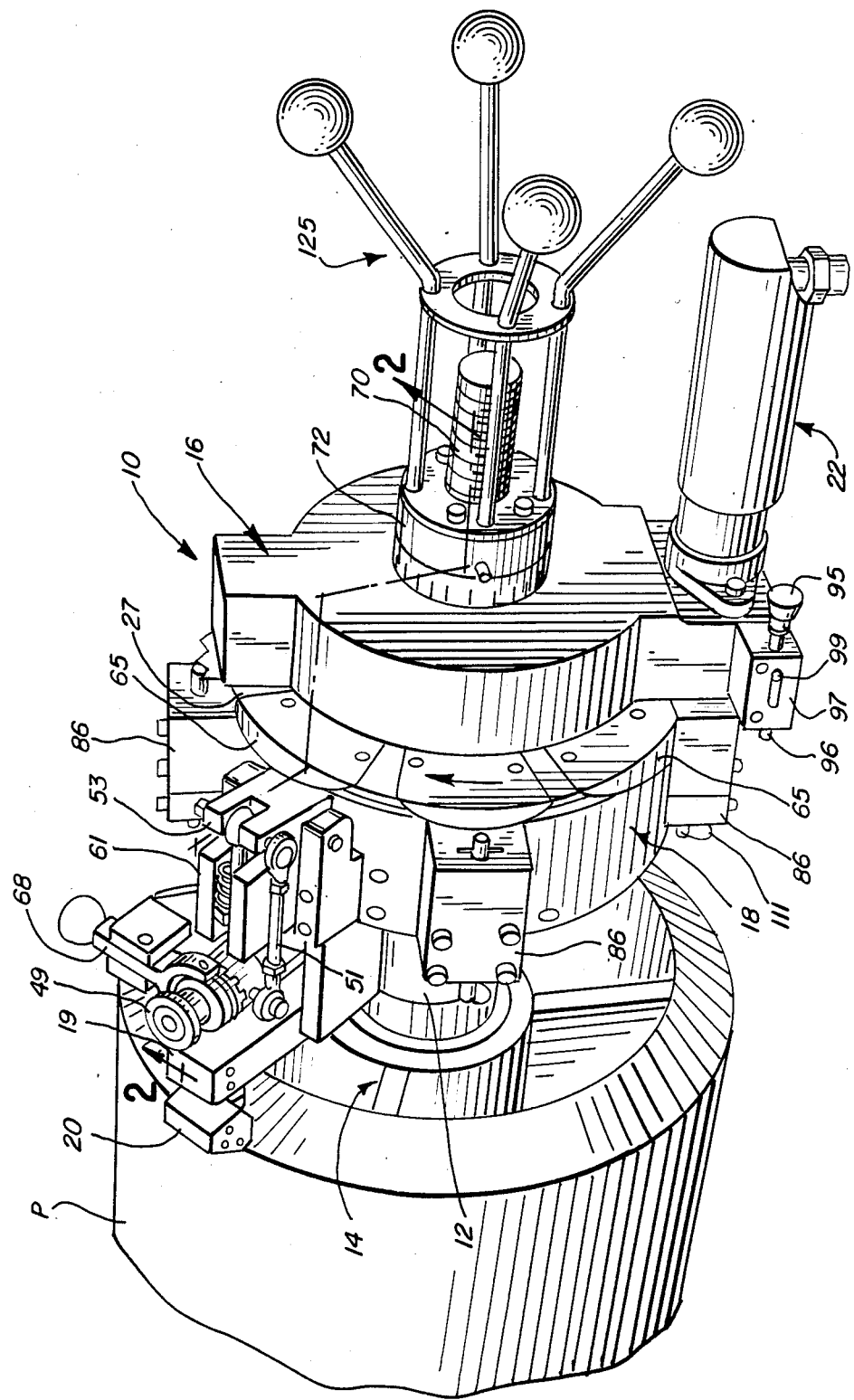
FIG. 1 is a perspective view of the portable end prep lathe shown in association with a pipe.

The portable end prep lathe, indicated generally at 10 in FIG. 1, is shown in association with a pipe P. A mast 12 has a chuck or mandrel, indicated generally at 14, positionable within the pipe and having plural elements movable radially outwardly to engage the wall of the pipe and locate the mast 12 concentrically of the pipe. A structure usable for this purpose is shown in the Wachs et al application Ser. No. 654,810, filed Sept. 26, 1984 and the disclosure thereof is incorporated herein by reference.

The mast 12 has a length adequate to mount a housing, or frame, 16 which may move axially of the mast, but which is prevented from rotating relative thereto. A tool head 18 is rotatably mounted on the frame 16 and has a tool holder 19 carrying a tool 20 which can be moved at an angle to cut a bevel on an end of the pipe P as the result of movement of the tool holder 19 radially of the mast as well as movement axially thereof.

A motor 22, which may be either hydraulic or air-operated, is mounted on the frame 16 for causing rotation of the tool head 18.

Figure 2:
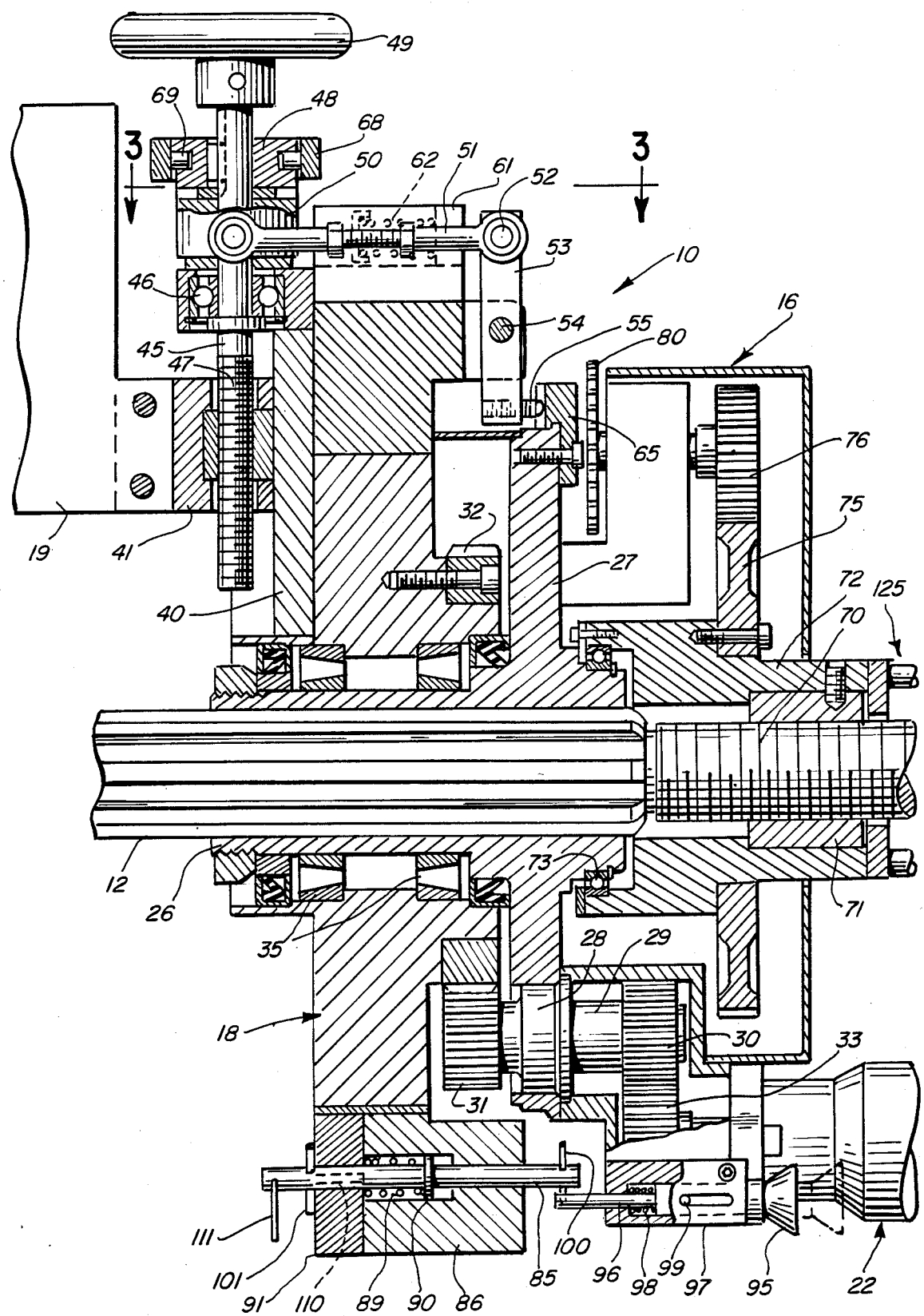
FIG. 2 is a fragmentary central vertical section, on an enlarge scale, of the portable end prep lathe, shown in FIG. 1 and taken generally along the line 2—2 in FIG. 1.
Figure 3:
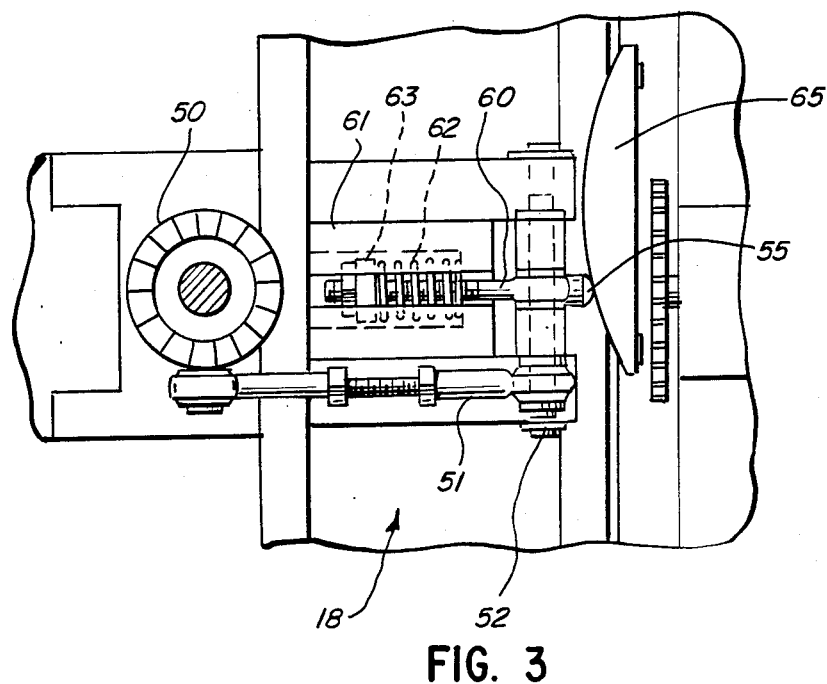
FIG. 3 is a plan section, taken generally along the line 3—3 in FIG. 2.

The structure may be described in greater detail by referring to FIG. 2. The frame 16 includes a member 26 having a tubular section which is splined to the mast 12 to permit axial movement of the frame without rotation relative to the mast and also has an annular flange section 27. This section has a bearing 28 rotatably mounting a shaft 29 having the gears 30 and 31, with the gear 31 meshing with an annular gear 32 on the tool head 18. The motor 22 operates through a gear reduction unit to drive a gear 33 in mesh with the gear 30 whereby operation of the motor 22 through the gearing results in rotation of the tool head 18. The tool head is rotatably mounted on the frame section 26 by means of bearings 35.

The tool head 18 has a fixed tool post 40 which, by means of suitable conventional guide means, mounts a tool slide 41 for movement radially of the mast 12, and therefore radially of the axis of the pipe P. The tool slide 41 mounts the tool holder 19 which carries the tool 20.

The tool slide is caused to move by tool-advancing means responsive to rotation of the tool head 18. This means includes a lead screw shaft 45 rotatably mounted in a bearing 46 and threadably engaged with the tool slide 41 at 47 and which is keyed to a slidable clutch member 48 and has a knob 49 at its upper end. A second clutch member 50 is free to rotate on the lead screw shaft 45 and is connected to an adjustable link 51 pivotally connected by a pin 52 to a cam follower arm 53. The cam follower arm 53 is pivoted to the tool head by a pin 54 and has a cam follower 55 at its lower end.

The cam follower arm 53 has a bifurcated upper end and a rod 60 is connected thereto by the pin 52 and extends into an opening in a block 61 whereby a spring 62 positioned in the opening and seated between an end of the opening and a nut 63 threaded on the rod 60 acts to urge the cam follower arm 53 in a counterclockwise direction, as viewed in FIG. 2.

A plurality of cams 65 is circumferentially spaced and mounted on the frame flange section 27 whereby, as the tool head 18 rotates relative to the frame, the cam follower 55 engages successive cams 65 to pivot the cam follower arm 53 in a clockwise direction about the pin 54 to impart rotation to the clutch member 50 which acts to rotate the lead screw shaft 45 and cause advance of the tool slide 41. The clutch members 48 and 50 can be separated by operation of a pivoted lever 68 having a bifurcated end mounting pins 69 engageable in an external annular groove in the clutch member 48. The clutch may be disengaged when it is desired to move the tool slide by manual operation of the knob 49.

From the foregoing, it will be evident that the radial advance of the tool slide 41 for each revolution of the tool head 18 is dependent upon the number of cams 65 fixed to the frame flange section 27.

Means for advancing the tool head and frame axially of the pipe and the mast 12 comprises a threaded section 70 at an end of the mast and a nut 71 threaded thereon which is fixed to a tubular member 72 supported from the frame section 26 by a bearing 73. A gear 75 surrounds the tubular member 72 and meshes with a gear 76 on a shaft 77 rotatably mounted in bearings 78 (FIG. 4) which are supported by a frame member 79 fixed to the frame flange section 27. A star wheel 80 is fixed to the shaft 77 whereby each indexing movement of the star wheel 80 results in a partial revolution of the gear 76 to resultingly impart rotation to the nut 71 whereby the nut moves relative to the threaded section 70 and there is resulting movement of the frame 16 and tool head 18.

Figure 4:
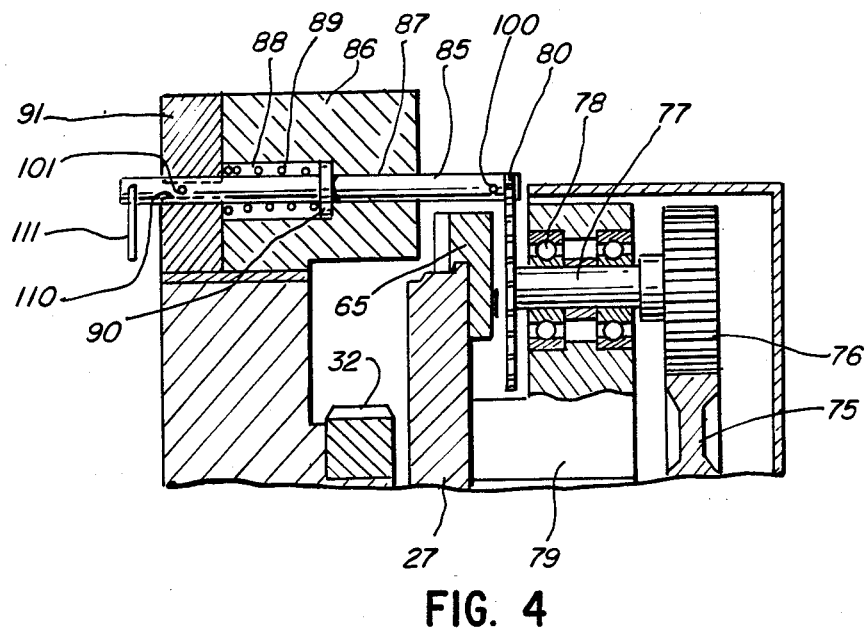
FIG. 4 is a fragmentary section, showing axial advance means for the portable end prep lathe in operative position.

The indexing movement of the star wheel 80 is derived from rotation of the tool head 18 relative thereto and by the use of one or more of a plurality of actuator pins 85. Each of these actuator pins 85 is mounted in a housing 86, with there being four of these housings circumferentially spaced about the exterior of the tool head. Three of these housings are visible in FIG. 1 and the particular structure thereof is shown in FIGS. 2 and 4.

A housing 86 for an actuator pin 85 has a bore of two different diameters, with a first bore guiding the actuator pin for axial movement and the second bore 88 being of a larger diameter to house a spring 89 engageable with a flange 90 on the actuator pin and a plate 91 defining an end of the housing 86. The spring 89 urges an actuator pin 85 to the operative position shown in FIG. 4 wherein an end of the actuator pin will be movable with the tool head in a path to intersect the star wheel 80 and impart an indexing movement thereto.

The actuator pins 85 also have an inoperative position and pre-operative position. The pre-operative position is shown in FIG. 2. In this position, the actuator pin does not extend outwardly from the housing 86 a sufficient distance to contact the star wheel 80 as the tool head 18 rotates. The actuator pin 85 can be caused to move from pre-operative position to operative position by manually operable means, shown in FIG. 2, including a button 95 fixed to a rod 96 movable in a housing 97 fixed to the housing for the motor 22. The rod 96 has a normal inoperative position to the right of the position shown in FIG. 2 under the urging of a spring 98. The rod 96 has limits of movement, as determined by the movement of a pin 99 connected thereto in an associated slot in the housing 97. When the button 95 is pushed to the position shown in FIG. 2 against the action of the spring 98, the rod 96 is positioned to engage a cross pin 100 on the actuator pin 85 to impart a small amount of rotation to the actuator pin. This small amount of rotation results in rotation of a retainer pin 101 into alignment with a slot 110 in the housing plate 91 whereby the retainer pin 101 can move from the position shown in FIG. 2 to the position shown in FIG. 4, with resulting full extension of the actuator pin 85.

The control of the position of the actuator pin 85 is determined by the alignment of the retainer pin 101 relative to the slot 110 in the plate 91. This transverse slot is shown in broken line in FIG. 2 and the retainer pin 101 is out of alignment with the slot 110 and held in a slight depression in the face of plate 91. However, the rod 96 is positioned to engage the cross pin 100 and, with tool head rotation, rotation is imparted to the actuator pin 85 sufficient to bring the retainer pin 101 out of the depression and into alignment with the slot 110 whereby the spring 89 can urge the actuator pin to the operative position shown in FIG. 4. The inoperative position of the actuator pin has the actuator pin in the position shown in FIG. 2. However, cross pin 100 is positioned so that it will not be contacted by the rod 96 when the latter is extended, whereby rotation will not be imparted to the actuator pin 85 and it will be retained in an inoperative position. The retainer pin 101 engages in a second slight depression in the face of plate 91. Each actuator pin has a ring 111 to enable manual axial and rotational movement thereof.

With there being four of the actuator pins 85, it is possible to have only one actuator pin operative, whereby the rate of axial advance of the tool head 18 relative to the rate of advance of the tool slide 41 will be relatively small to cut a small angle bevel. Alternatively, two or more actuator pins can be in operative position and a proportionally larger bevel angle can be cut. When it is desired to provide a compound angle bevel, one or more actuator pins may be initially operative and one or more additional actuator pins may be positioned in the pre-operative position. When the bevel angle is to be increased, the button 95 is pushed to bring the additional actuator pins 85 into operation as the tool head rotates to increase the angle of the bevel. This change in angle can be accomplished without stopping the machine.

Axial movement of the tool head and frame can be achieved manually, as for set-up, by rotation of the structure, indicated generally at 125, which is connected to the tubular member 72 and, thus, provides for rotation of the nut 71 threaded on the threaded section 70 of the mast.

We claim:

1. A portable end prep lathe having a frame, means attachable to a pipe and movably mounting said frame, a rotatable tool head on said frame, means coacting between the frame and the tool head for rotating the tool head on said frame, a tool slide mounted on said tool head for movement radially of a pipe, means on the tool head for moving the tool slide on said tool head, and means mounting the tool head and frame for movement axially of the pipe, means responsive to the rotation of the tool head for moving the tool head and frame axially of the pipe, a star wheel in a fixed position relative to tool head rotation, a plurality of actuator pins circumferentially spaced about the tool head for successive engagement with the star wheel, said actuator pins being movable and having an inoperative position and a pre-operative position, means urging the actuator pins to an operative position, a retainer pin for each actuator pin for holding an actuator pin against the action of the urging means, said retainer pin being movable into a slot to free the actuator pin in response to the rotation of an actuator pin, each actuator pin having a cross pin, and manually operable means on the frame for engaging a cross pin to rotate an actuator pin and cause an actuator pin to move from pre-operative position to operative position as an actuator pin moves past said manually operable means.

2. A machining tool for a pipe comprising, a frame, a mast for mounting said frame beyond an end of the pipe in concentric relation therewith, a tool head rotatably mounted on said frame, means coacting between the frame and the tool head for rotating the tool head, a tool post mounted on said tool head, a tool slide movable on said tool post radially of said mast, means including at least one cam on said frame and cam follower mechanism on the tool head for moving the tool slide on the tool post as the tool head rotates, selectively operable means responsive to rotation of said tool head for moving said tool head and frame axially of said mast whereby a bevel may be cut on the pipe by a combination of said radial and axial movements simultaneously imparted to a tool carried by the tool slide, said selectively operable means including an indexable member on said frame, and one or more selectively positionable members on said tool head positioned to sequentially engage said indexable member during rotation of the tool head relative to the frame, said indexable member is a star wheel and said selectively positionable members are actuator pins movable between operative and inoperative positions, said mast has a part thereof with an external thread, a nut rotatably mounted on said frame and threaded on said external thread, a drive connection between said star wheel and said nut; and means urging said actuator pins to and operative position, means to hold the actuator pins in a pre-operative position, and means on the frame to trip the actuator pin holding means and permit the actuator pins to move an operative position.

3. A portable end prep lathe comprising, a mast mountable in fixed relation to a pipe and having a threaded section, a frame splined to said mast, a tool head rotatably mounted on said frame and having a tool slide movable radially of said mast, means on the tool head for rotating the tool head, means including at least one cam on the frame responsive to tool head rotation for advancing the tool slide radially, a nut threaded on the threaded section of the mast and rotatable on said frame, a rotatable star wheel on said frame, gearing interconnecting said star wheel and nut whereby rotation of the star wheel rotates the nut to move the frame axially of the mast, means on the tool head for indexing the star wheel responsive to rotation of the tool head to cause a tool on the tool slide to have axial movement and with said radial movement cut a bevel on the pipe comprising, a plurality of movable actuator pins circumferentially spaced about the tool head and having an operative position to successively engage the star wheel as the tool head rotates, said actuator pins being movable and having an inoperative position, means urging the pins to operative position and a retainer pin holding an actuator pin against the action of said urging means, said retainer pin being movable into a slot to free the actuator pin in response to the rotation of an actuator pin.

4. A portable end prep lathe as defined in claim 3 wherein said actuator pins each have a pre-operative position and a cross pin, and manually operable means on the frame for engaging a cross pin to rotate an actuator pin and cause an actuator pin to move from pre-operative position to operative position as an actuator pin moves past said manually operable means.

* * * * *